United States Patent [19]

Chung et al.

[11] Patent Number: 5,448,682
[45] Date of Patent: Sep. 5, 1995

[54] PROGRAMMABLE MULTILAYER NEURAL NETWORK

[75] Inventors: Ho-sun Chung, Taegu; Kyung-hun Lee, Kyungsangbuk-do, both of Rep. of Korea

[73] Assignee: Gold Star Electron Co., Ltd., Chungcheongbuk-do, Rep. of Korea

[21] Appl. No.: 373,479

[22] Filed: Jan. 17, 1995

Related U.S. Application Data

[63] Continuation of Ser. No. 68,164, May 28, 1993, abandoned.

[30] Foreign Application Priority Data

May 30, 1992 [KR] Rep. of Korea .................. 92-9480

[51] Int. Cl.⁶ ............................................. G06F 15/18
[52] U.S. Cl. ................................................ 395/27; 395/24
[58] Field of Search ........................... 395/22, 23, 24, 27

[56] References Cited

U.S. PATENT DOCUMENTS

| | | | |
|---|---|---|---|
| 4,807,168 | 2/1989 | Moopenn | 395/27 |
| 4,951,239 | 8/1990 | Andes et al. | 364/807 |
| 5,093,900 | 3/1992 | Graf | 395/24 |
| 5,101,361 | 3/1992 | Eberhardt | 395/24 |
| 5,111,430 | 5/1992 | Morie | 365/185 |

OTHER PUBLICATIONS

Synaple-X: A General-purpose neurocomputer Architecture U. Ramacher IEEE/18–21 Nov. 1991.

*Primary Examiner*—Allen R. MacDonald
*Assistant Examiner*—Richemond Dorvil
*Attorney, Agent, or Firm*—Rothwell, Figg, Ernst & Kurz

[57] ABSTRACT

A programmable multilayer neural network includes a weight storing circuit for storing the weight of each synapse to perform an intended function, an interfacing circuit for transmitting the weight value stored in the storing circuit to each synapse, and a multilayer neural network circuit programmed to have the weight from the weight storing circuit and for outputting an intended output.

6 Claims, 4 Drawing Sheets

FIG. 1A
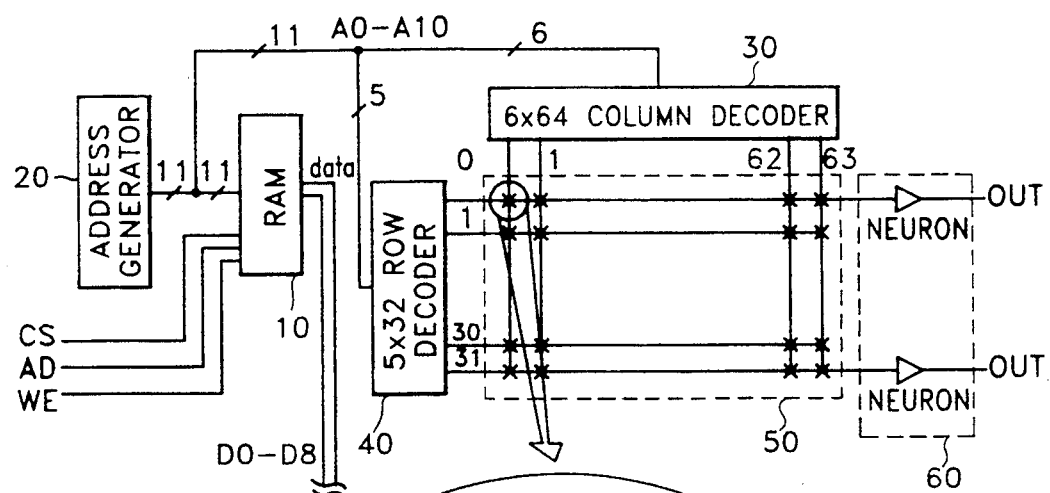
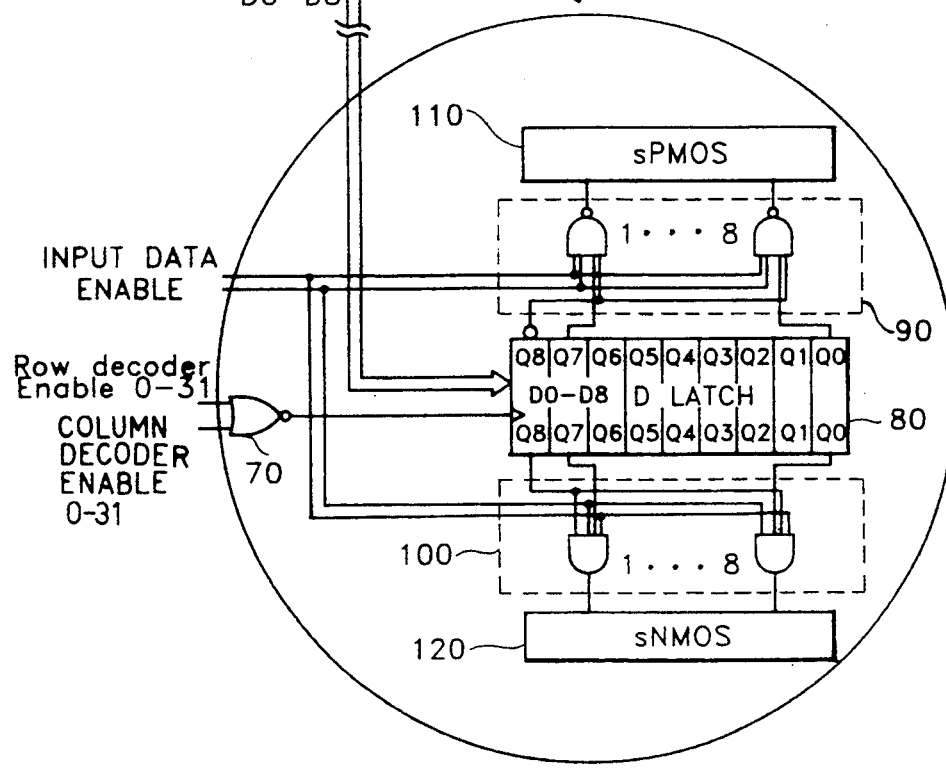
FIG. 1B

PROGRAMMABLE MULTILAYER NEURAL NETWORK

This is a continuation of application Ser. No. 08/068,164, filed May 28, 1993, abandoned.

BACKGROUND OF THE INVENTION

The present invention relates to a neural network, and more particularly to a multilayer neural network.

Generally, a multilayer neural network is designed to establish a learned synapse weight for each synapse, to perform an intended function. Thus, the multilayer neural network can perform only one function, which impedes the realization of a recognition system using a multilayer neural network.

SUMMARY OF THE INVENTION

Therefore, it is an object of the present invention to provide a programmable multilayer neural network with which a user can perform multiple functions by using one multilayer neural network.

To accomplish the object there is provided a programmable multilayer neural network comprising weight storing means for storing the weight of each synapse to perform an intended function; interfacing means for transmitting the weight value stored in tile storing means to each synapse; and multilayer neural network means programmed to have the weight from the weight storing means and for outputting an intended output.

BRIEF DESCRIPTION OF THE DRAWINGS

The above object and advantages of the present invention will become more apparent by describing in detail a preferred embodiment thereof with reference to the attached drawings in which:

FIG. 1 a block diagram of one embodiment of a multilayer neural network of the present invention which is user-programmable and composed of 8-bit synapses;

DETAILED DESCRIPTION OF THE INVENTION

Figure 2:
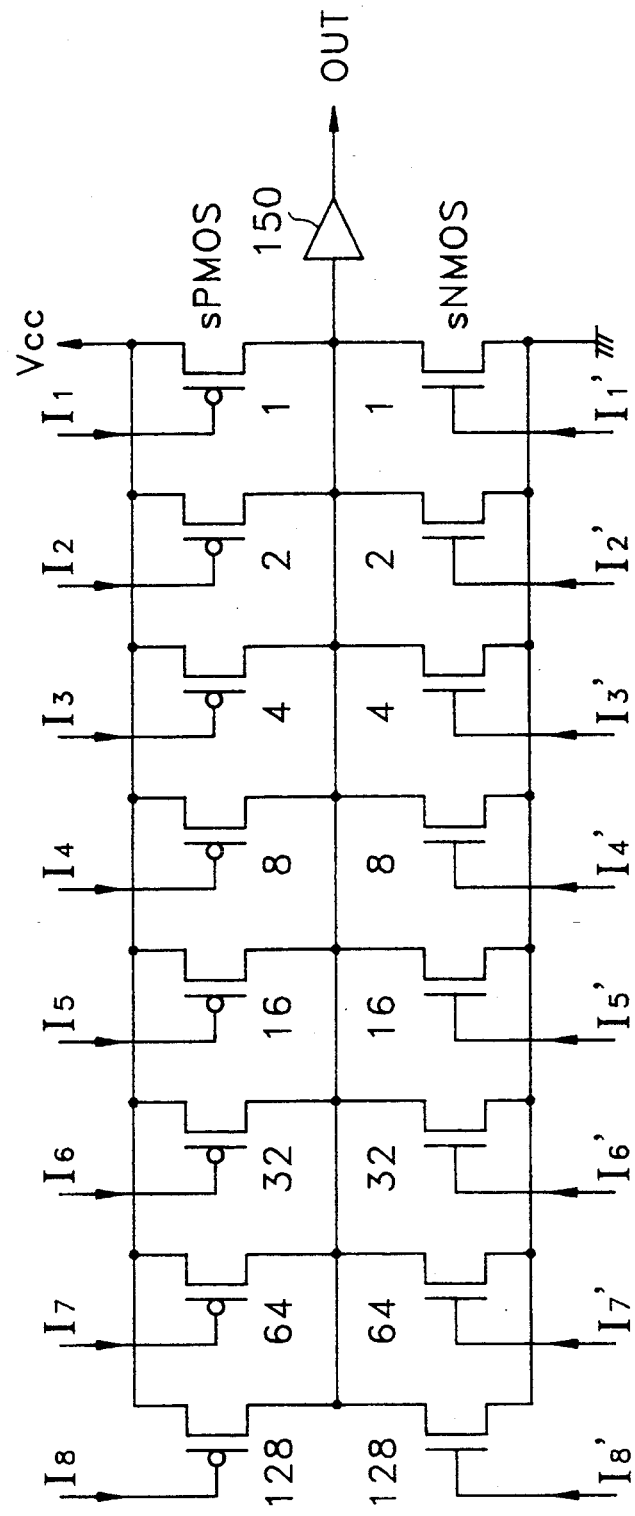
FIG. 2 illustrates an 8-bit neural comparator used in FIG. 1.

Referring to FIG. 1, the programmable multilayer neural network comprises a memory 10 for storing the weight of a learned result and transmitting stored weights (D0-D8) to each synapse, an address generator 20 for generating corresponding addresses (A0-A10) of memory 10, a 6-by-64 column address decoder 30 for receiving and decoding the output signal of address generator 20 to generate a column address signal, a 5-by-32 row address decoder 40 for receiving and decoding the output signal of address generator 20 to generate a row address signal, a multilayer neural network 50 consisting of an array of synapses which are selected by row address decoder 30 and column address decoder 40 and have the weights stored in memory 10, and neurons 60 for outputting the output values of the synapses.

The synapses each have a NOR gate 70 for receiving the output signals from 6-by-64 column address decoder 30 and 5-by-32 row address decoder 40, a D latch 80 operated in response to the output signal of NOR gate 70 and for storing the weights stored in memory 10 (most significant bit Q8 of D latch 80 being a sign bit for storing the sign of the data and the remaining bits being designated as magnitude bits), NAND gates 90 for outputting the signal stored in D latch 80 in response to the case when input data, an enable signal and the sign bit are each "0," AND gates 100 for outputting the signal stored in D latch 80 in response to the case when the input data, enable signal and sign bit signal are each "1," a synapse PMOS transistor 110 enabled by the output signal of NAND gates 90, and a synapse NMOS transistor 120 enabled by the output signal of AND gates 100. The above configuration is capable of connecting multiple 8-bit multilayer neural networks as well as single neural networks. Further, when the circuit is integrated on a chip, other circuits (besides the multilayer neural network chip) could be provided externally.

The multilayer neural network of the present invention operates as follows.

First step: Weights obtained from learning are stored in memory 10 corresponding to the address selected by address generator 20 in response to a chip selection signal and a write enable signal.

Second step: The data stored in memory 10 responding to a read enable signal and corresponding to the address selected by the output signal of address generator 20, is latched in D latch 80. Simultaneously, the output signal of address generator 20 is fed to row address decoder 40 and column address decoder 30, and is then decoded to select one synapse.

Third step: If the output of row address decoder 40 and column address decoder 30 is present, the data stored in D latch 80 is output. Simultaneously, NAND gates 90 and AND gates 100 receive input data and an enable signal to enable their outputs so that synapse PMOS transistor 110 and synapse NMOS transistor 120 can have the proper weights. By doing so, the programmable multilayer neural network is accomplished.

Referring to FIG.2, in a synapse MOS transistor, the drain electrodes of the synapse PMOS transistor (sPMOS) and the synapse NMOS transistor (sNMOS) which respectively have magnitudes of 1, 2, 4, 8, 16, 32, 64 and 128, are commonly connected. The source electrode of each synapse PMOS transistor is connected to the power supply voltage (Vcc) and the gate electrode thereof receives a first input signal $I_1-I_8$. The source electrode of the synapse NMOS transistor is connected to ground and the gate electrode thereof receives a second input signal $I_1'-I_8'$. The output of tile drain electrodes is output via a common node through a neuron 150.

Figure 3:
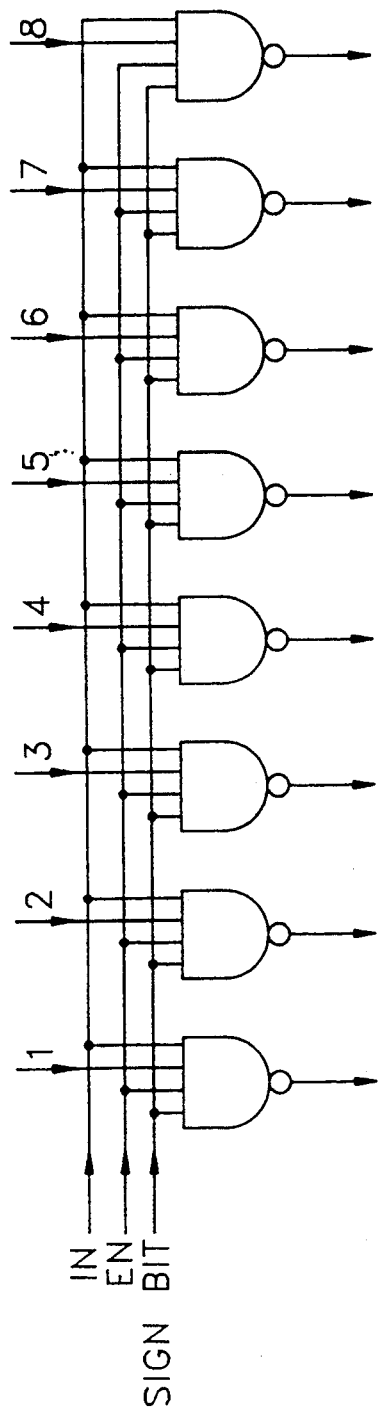
FIG. 3 illustrates an 8-bit 4-input NAND gate used in the neural network shown in FIG. 1.

Referring to FIG. 3, in the eight 4-input NAND gates for receiving 8-bit data in response to an input signal IN, an enable signal EN and sign bit data, given that input signal IN, enable signal EN and sign bit data are at "low" logic levels, when the data input to the NAND gates is a logic "low," the output data is "high," and when the data input to the NAND gates is a logic "high," the output data is "low."

Figure 4:
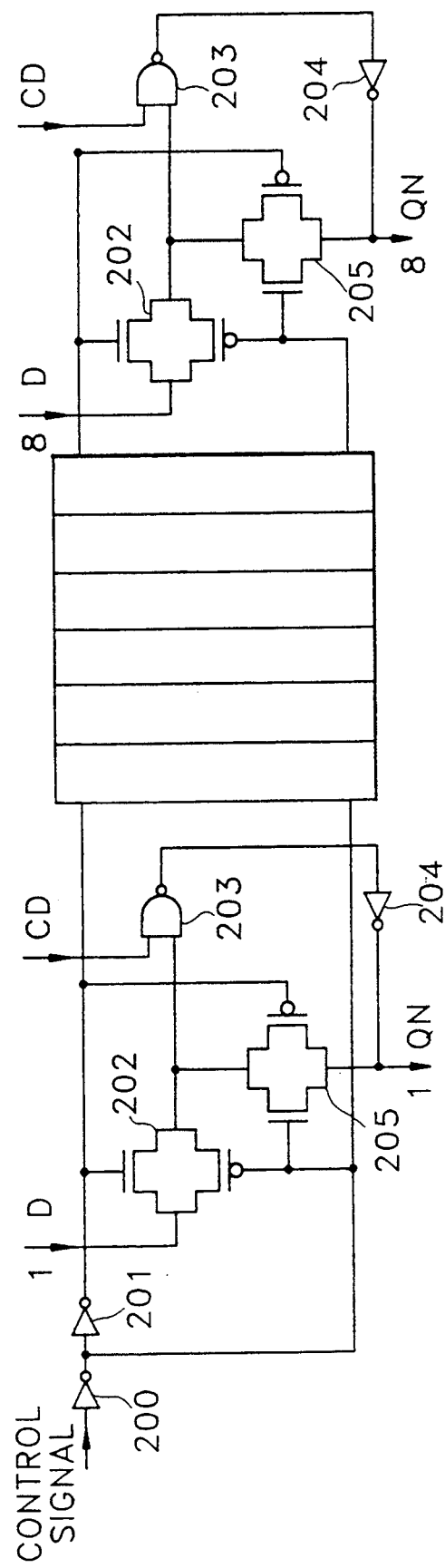
FIG. 4 illustrates an 8-bit D latch used in the neural network shown in FIG. 1.

Referring to FIG.4, each bit of the 8-bit D latch comprises an inverter 200 for inverting a control signal, an inverter 201 for inverting the output of inverter 200, CMOS gates 202 controlled by the outputs of inverters 200 and 201 and for transmitting an input signal (D). NAND gates 203 for receiving the output signal of CMOS transmission gates 202 and a reset signal (CD), inverters 204 for inverting the output signal of NAND gates 203, and CMOS transmission gates 205 for transmitting the output signal of CMOS transmission gates 202 in response to the output signal of inverters 200 and 201, so as to latch and output a signal (QN) in response to the input data.

Figures 5, 6:
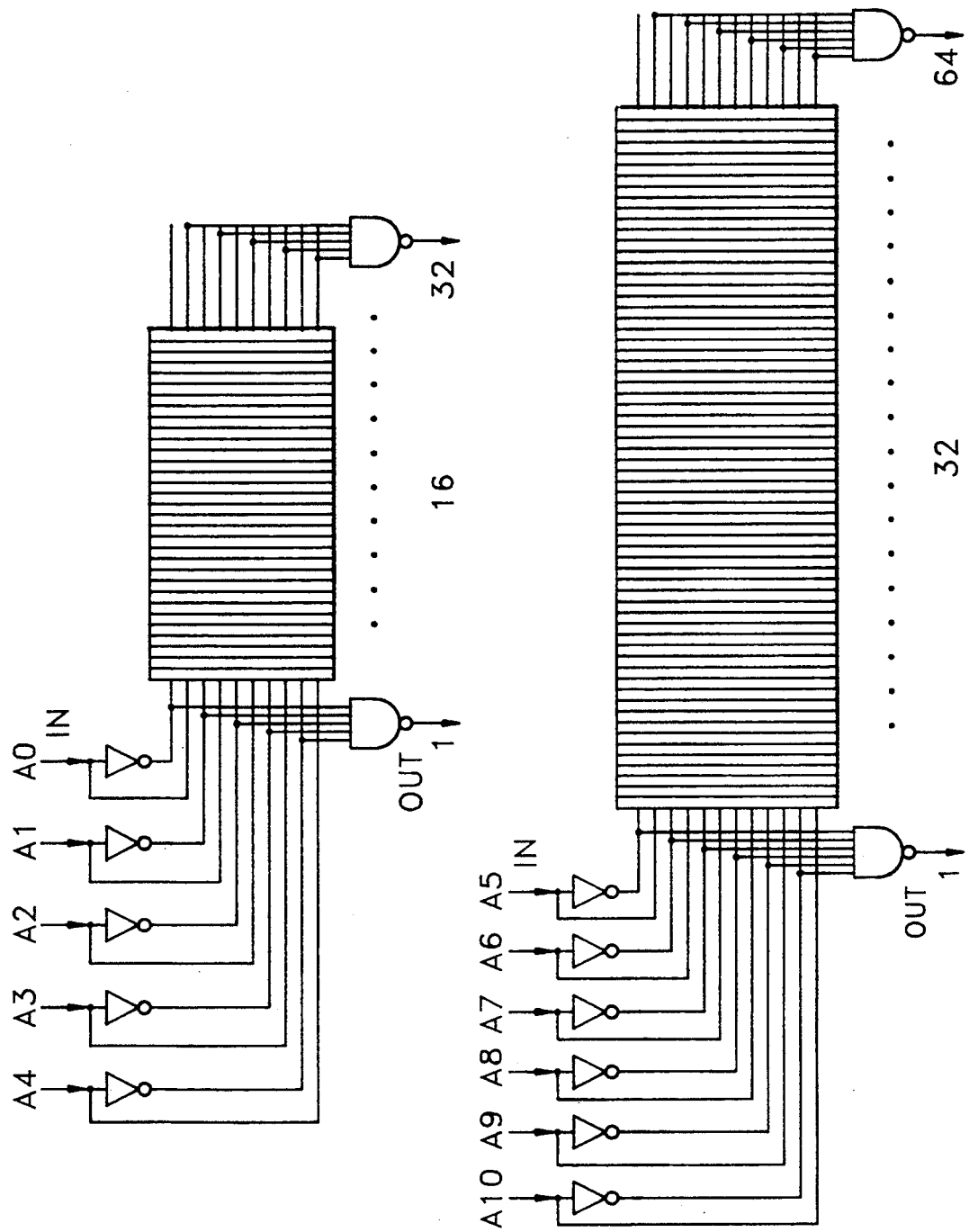
FIG. 5 illustrates a 5-by-32 column decoder used in FIG. 1.
Fig. 6 illustrates a 6-by-64 row decoder used in the neural network shown in Fig. 1.

Referring to FIG. 5, the 5-by-32 column address decoder is composed of 5-input NAND gates for receiving five address signals (A0–A4) and five inverted address signals and enabling only one of these to be output.

Referring to FIG.6, the 6-by-64 row address decoder is composed of 6-input NAND gates for receiving six address signals (A5–A10) and six inverted address signals and enabling only one of these to be output.

For the latch and decoders, any generally used chips can be used.

Accordingly, the present invention has certain advantages: first, the present invention can be preferably used in a recognition circuit for voice or character recognition: and secondly, the present invention can be programmed to satisfy any intended I/O function.

What is claimed is:

1. A programmable multilayer neural network comprising:

weight storing means for storing a weight of each synapse to perform a predetermined function;

interfacing means for transmitting the weight of each synapse stored in said storing means to each synapse; and multilayer neural network means for receiving the weight of each synapse from said weight storing means via said interfacing means and for outputting an output, said multilayer neural network means including an array of synapses, each synapse having a synapse PMOS transistor including multiple PMOS transistors for making the weight of the synapse positive, each of said multiple PMOS transistors representing a predetermined weight value, a synapse NMOS transistor including multiple NMOS transistors for making the weight of the synapse negative, each of said multiple NMOS transistors representing a predetermined weight value, and means for selecting specific ones of said multiple PMOS transistors or said multiple NMOS transistors for making the weight.

2. A programmable multilayer neural network as claimed in claim 1, wherein said storing means comprises:

a readable and writable memory having memory locations, each having a unique address; and an address designating counter for designating the addresses of said storing means.

3. A multilayer neural network as claimed in claim 1, wherein said interfacing means comprises:

a row address designating decoder for designating row addresses of said multilayer neural network: and a column address designating decoder for designating column addresses of said multilayer neural network.

4. A programmable multilayer neural network as claimed in claim 3, wherein each synapse further includes a latch for receiving the weight stored in said weight storing means in accordance with an applied clock signal responding to the output of said interfacing means; and gates for transmitting the weights stored in said latch to said synapse PMOS transistor and synapse NMOS transistor in response to an external enable signal and an input data.

5. A programmable multilayer neural network as claimed in claim 4, wherein said synapse PMOS transistor comprising a plurality of gates of different lengths formed on one transistor.

6. A programmable multilayer neural network as claimed in claim 4, wherein said synapse NMOS transistor comprising a plurality of gates of different lengths formed on one transistor.

* * * * *

UNITED STATES PATENT AND TRADEMARK OFFICE
CERTIFICATE OF CORRECTION

PATENT NO. : 5,448,682
DATED : September 5, 1995
INVENTOR(S) : HO-SUN CHUNG ET AL.

It is certified that error appears in the above-indentified patent and that said Letters Patent is hereby corrected as shown below:

COLUMN 1
    Line 27, "tile" should read --the--;
    Line 38, after "1" insert --is--;
    Line 39, after "invention" insert --,--; and
    Line 44, "." should read --;--.

COLUMN 2
    Line 55, "tile" should read --the--.

COLUMN 3
    Line 2, "." should read --,--.

Signed and Sealed this

Fourteenth Day of May, 1996

Attest:

BRUCE LEHMAN

Attesting Officer     Commissioner of Patents and Trademarks